(12) United States Patent
Crandall et al.

(10) Patent No.: US 8,813,842 B2
(45) Date of Patent: Aug. 26, 2014

(54) PARTICLES COMPRISING BLOCKED ISOCYANATE RESIN AND METHOD OF MODIFYING A WELLBORE USING THE SAME

(75) Inventors: Michael D. Crandall, North Oaks, MN (US); Ignatius A. Kadoma, Cottage Grove, MN (US); Clara E. Mata, Lindstrom, MN (US); Yong K. Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 430 days.

(21) Appl. No.: 13/141,576

(22) PCT Filed: Dec. 21, 2009

(86) PCT No.: PCT/US2009/068940
§ 371 (c)(1),
(2), (4) Date: Jun. 22, 2011

(87) PCT Pub. No.: WO2010/075256
PCT Pub. Date: Jul. 1, 2010

(65) Prior Publication Data
US 2011/0253372 A1    Oct. 20, 2011

Related U.S. Application Data

(60) Provisional application No. 61/140,428, filed on Dec. 23, 2008.

(51) Int. Cl.
*E21B 33/13* (2006.01)
*E21B 43/22* (2006.01)
*E21B 43/24* (2006.01)
*C09K 8/42* (2006.01)

(52) U.S. Cl.
USPC ........... 166/295; 166/279; 166/300; 166/302; 507/117; 507/219; 523/130; 175/72

(58) Field of Classification Search
None
See application file for complete search history.

(56) References Cited

U.S. PATENT DOCUMENTS

| 3,339,633 A | 9/1967 | Richardson |
| 3,419,073 A | 12/1968 | Brooks |

(Continued)

FOREIGN PATENT DOCUMENTS

| CA | 2514311 | 2/2006 |
| EP | 0265221 | 4/1988 |

(Continued)

OTHER PUBLICATIONS

Wicks, "Blocked isocyanates III.: Part. A, Mechanisms and chemistry" Progress in Organic Coatings, Jul. 1999, vol. 36, No. 3, pp. 148-172.

(Continued)

*Primary Examiner* — Zakiya W Bates (57) ABSTRACT

A plurality of solid particles including a thermoplastic composition having a softening temperature in a range from 50° C. to 180° C. and a blocked isocyanate resin; optionally at least some of the particles in the plurality of solid particles comprise both the thermoplastic composition and the blocked isocyanate resin. A composition comprising the plurality of particles dispersed in a fluid is also disclosed. A method of modifying a wellbore within a geological formation is also disclosed. The method includes introducing the fluid composition into the wellbore. A method of making a plurality of particles, for example, to use in the fluid composition, is also disclosed.

20 Claims, 1 Drawing Sheet

(56) References Cited

U.S. PATENT DOCUMENTS

| | | | |
|---|---|---|---|
| 3,481,403 | A | 12/1969 | Gidley |
| 3,968,088 | A | 7/1976 | Asai |
| 4,622,155 | A | 11/1986 | Harris |
| 4,745,148 | A | 5/1988 | Chung |
| 4,863,646 | A | 9/1989 | Watanabe |
| 5,006,611 | A | 4/1991 | Schmid |
| 5,129,458 | A | 7/1992 | King |
| 5,330,005 | A | 7/1994 | Card |
| 5,501,275 | A | 3/1996 | Card |
| 5,582,249 | A | 12/1996 | Caveny |
| 5,591,199 | A | 1/1997 | Porter |
| 5,846,915 | A | 12/1998 | Smith |
| 6,017,831 | A | 1/2000 | Beardsley |
| 6,085,842 | A | 7/2000 | Bossaerts |
| 6,172,011 | B1 | 1/2001 | Card |
| 6,177,508 | B1 | 1/2001 | Ohmori |
| 6,528,157 | B1 | 3/2003 | Hussain |
| 6,732,800 | B2 | 5/2004 | Acock |
| 6,848,519 | B2 | 2/2005 | Reddy |
| 6,981,560 | B2 | 1/2006 | Nguyen |
| 7,066,262 | B2 | 6/2006 | Funkhouser |
| 2003/0230408 | A1 | 12/2003 | Acock |
| 2004/0194961 | A1 | 10/2004 | Nguyen |
| 2005/0045330 | A1 | 3/2005 | Nguyen |
| 2005/0143548 | A1 | 6/2005 | Loontjens |
| 2005/0194142 | A1 | 9/2005 | Nguyen |
| 2005/0230027 | A1 | 10/2005 | Kassa |
| 2005/0272611 | A1 | 12/2005 | Lord |
| 2006/0032633 | A1 | 2/2006 | Nguyen |
| 2006/0035790 | A1 | 2/2006 | Okell |
| 2010/0272994 | A1 | 10/2010 | Carlson |
| 2010/0288500 | A1 | 11/2010 | Carlson |

FOREIGN PATENT DOCUMENTS

| | | |
|---|---|---|
| EP | 0442700 | 8/1991 |
| EP | 0619415 | 10/1994 |
| EP | 771935 | 5/1997 |
| EP | 1439315 | 7/2004 |
| GB | 1036891 | 7/1966 |
| GB | 2431949 | 5/2007 |
| JP | 2001-98427 | 4/2001 |
| JP | 2003-193332 | 7/2003 |
| JP | 2004-115958 | 4/2004 |
| WO | WO 2007-010210 | 1/2007 |
| WO | WO 2007-050520 | 5/2007 |
| WO | WO 2009-079231 | 6/2009 |
| WO | WO 2009-079310 | 6/2009 |
| WO | WO 2010-075248 | 7/2010 |
| WO | WO 2010-075253 | 7/2010 |

OTHER PUBLICATIONS

International Search Report for PCT/US2009/068940, mailed Mar. 19, 2010, 4 pages.

European Search Report for Application No. EP 13179836, dated Oct. 11, 2013.

US 8,813,842 B2

PARTICLES COMPRISING BLOCKED ISOCYANATE RESIN AND METHOD OF MODIFYING A WELLBORE USING THE SAME

CROSS-REFERENCE TO RELATED APPLICATION

This application is a national stage filing under 35 U.S.C. 371 of PCT/US2009/068940, filed Dec. 21, 2009, which claims priority to U.S. Provisional Patent Application No. 61/140,428, filed Dec. 23, 2008, the disclosure of which is incorporated by reference herein in its entirety.

BACKGROUND

Rotary drilling methods are commonly used in the drilling of oil and gas wells. Typically, the wellbore which extends from the surface into one or more subterranean oil and/or gas producing formations is drilled by a rotary drilling rig on the surface which rotates a drill bit attached to a string of drill pipe. The drill bit includes rotatable cutting surfaces so that when the drill bit is rotated by the drill string against subterranean strata under pressure a bore hole is produced.

Typically, a drilling fluid is circulated downwardly through the drill string, through the drill bit and upwardly in the annulus between the walls of the wellbore and the drill string. The drilling fluid functions to maintain hydrostatic pressure on formations penetrated by the wellbore, which helps to prevent pressurized formation fluids from flowing into the wellbore, and to remove cuttings from the wellbore. As the drilling fluid is circulated, a filter cake of solids from the drilling fluid forms on the walls of the wellbore, which may result from initial fluid loss to the formation and may prevent additional fluid loss. The drilling fluid also cools and lubricates the drill bit.

The hydrostatic pressure created by the drilling fluid in the wellbore may fracture weak formations penetrated by the wellbore which can cause drilling fluid to be lost into the formations. When this occurs, the drilling of the wellbore must be stopped to seal the fractures, which is a time-consuming and expensive process.

Another problem with drilling and completing wellbores occurs when the wellbore is drilled into and through unconsolidated weak zones or formations (e.g., formed of clays, shales, or sandstone). The unconsolidated portions of the formation can slough off the sides of the wellbore, which enlarges the wellbore and often causes the drill bit and drill pipe to become stuck. If this occurs, drilling must be stopped and remedial steps taken.

The problems that can occur with drilling become more frequent or pronounced with infield drilling, drilling below old fields, and striving for deeper targets. Each of these situations has become more common in recent years.

A typical technique for solving these problems that can occur during drilling includes putting a casing or liner into the wellbore and sealing the wellbore with, for example, cement in the annular space between the walls of the wellbore and the exterior surface of the casing or liner. This technique of cementing pipe in the wellbore as the drilling progresses has a number of disadvantages including the time and expense incurred in placing and sealing the pipe as wellbore as the reduction in the wellbore diameter after each casing point. That is, the well diameter must be reduced below each casing point so that a smaller casing can be lowered through the previously placed casing and sealed in the wellbore.

Thus, there are needs for improved methods of drilling wellbores and strengthening unconsolidated weak zones or fractures in a geological formation.

SUMMARY

The present disclosure provides a plurality of particles that may be useful, for example, for strengthening weakly consolidated geological formations or geological formations fractured during the drilling process. The particles may, in some embodiments, be added to the formation during the drilling process without removing the drilling fluid (e.g., with a preflush) and without equipment changeover. Advantageously, pluralities of particles and methods according to the present disclosure can be customized for individual wells and conditions (e.g., the depth and temperature of the geological formation).

In one aspect, the present disclosure provides a plurality of solid particles comprising a thermoplastic composition having a softening temperature in a range from 50° C. to 180° C. and a blocked isocyanate resin, wherein optionally at least some of the particles in the plurality of solid particles comprise both the thermoplastic composition and the blocked isocyanate resin.

In another aspect, the present disclosure provides a composition comprising a fluid and the plurality of particles disclosed herein dispersed in the fluid.

In another aspect, the present disclosure provides a method of modifying a wellbore within a geological formation, the method comprising:

introducing the composition according to the present disclosure into the wellbore;

subjecting the thermoplastic composition to a temperature above its softening temperature;

subjecting the blocked isocyanate resin to a temperature sufficient to produce a free isocyanate resin; and at least partially curing the free isocyanate resin to form a plug in the wellbore. In some embodiments, subjecting the thermoplastic composition to a temperature above its softening temperature, subjecting the blocked isocyanate resin to a temperature sufficient to produce a free isocyanate resin, and at least partially curing the free isocyanate resin are subsequent to introducing the composition into the wellbore.

In another aspect, the present disclosure provides a method of making a plurality of particles, the method comprising:

selecting a zone of a geological formation to be drilled, the geological zone having a target depth and a temperature;

receiving data comprising the target depth and the temperature of the zone of the geological formation;

generating a formulation comprising a thermoplastic composition and a blocked isocyanate resin, wherein the thermoplastic composition is selected based at least partially on its softening temperature being below the temperature in the geological zone, wherein the blocked isocyanate resin is selected based at least partially on its deblocking temperature being below the temperature in the geological zone, and wherein the formulation is generated based at least partially on its gelling after the target depth is reached; and making the plurality of particles according to the formulation, wherein at least a portion of the plurality of particles comprises the thermoplastic composition, and wherein at least a portion of the plurality comprises the blocked isocyanate resin.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list and any combination of two or more items in the list.

The term "geological formation" includes both geological formations in the field (i.e., subterranean geological formations) and portions of such geological formations (e.g., core samples).

The term "introducing" includes placing a composition within a geological formation using any suitable manner known in the art (e.g., pumping, injecting, pouring, releasing, displacing, spotting, or circulating the fluorinated polymer into a well, wellbore, or geological formation).

All numerical ranges are inclusive of their endpoints unless otherwise stated.

BRIEF DESCRIPTION OF THE DRAWING

For a more complete understanding of the features and advantages of the present disclosure, reference is now made to the detailed description along with the accompanying FIGURE and in which.

DETAILED DESCRIPTION

The plurality (i.e., multiple) of solid particles according to the present disclosure comprises a thermoplastic composition and a blocked isocyanate resin, wherein optionally at least some of the particles in the plurality of solid particles comprise both the thermoplastic composition and the blocked isocyanate resin. In some embodiments, individual particles useful in practicing the present disclosure may comprise either the thermoplastic composition or the blocked isocyanate resin. For example, the plurality of particles may contain particles of more than one composition, wherein the thermoplastic composition and the blocked isocyanate resin are in separate solid particles of the plurality of solid particles. In some embodiments, at least some of the particles in the plurality of solid particles comprise both the thermoplastic composition and the blocked isocyanate resin. In some embodiments, at least some of the particles in the plurality of solid particles comprise both the thermoplastic composition and the blocked isocyanate resin in an admixture, for example, wherein the blocked isocyanate resin is uniformly mixed with a thermoplastic. In some embodiments, at least some of the particles disclosed herein have the thermoplastic composition and the blocked isocyanate resin in separate regions of the same particle, for example, if the blocked isocyanate resin is coated on the surface of a thermoplastic particle.

The solid particles disclosed herein typically have a low aspect ratio. The average aspect ratio of solid particles described herein may be, for example, less than 2:1 or up to 2:1, 1.9:1, 1.8:1, 1.7:1, 1.6:1, 1.5:1, 1.4:1, 1.3:1, 1.2:1, or 1.1:1. However, in some embodiments, higher aspect ratios may be desirable, for example, at least 3:1, 4:1, 5:1, 10:1, 25:1, 50:1, 75:1, 100:1, 150:1, 200:1, 250:1, 500:1, 1000:1, or more; or in a range from 2:1 to 1000:1. The solid particles, in some embodiments, have an average particle size of up to 4, 3, 2, 1.5, or 1 millimeters (mm). For example, the solid particles may have an average particle size in a range from 0.100 mm to 3 mm (i.e., about 140 mesh to about 5 mesh (ANSI)) (in some embodiments, in a range from 1 mm to 3 mm, 1 mm to 2 mm, 1 mm to 1.7 mm (i.e., about 18 mesh to about 12 mesh), 0.85 mm to 1.7 mm (i.e., about 20 mesh to about 12 mesh), 0.85 mm to 1.2 mm (i.e., about 20 mesh to about 16 mesh), 0.6 mm to 1.2 mm (i.e., about 30 mesh to about 16 mesh), 0.425 mm to 0.85 mm (i.e., about 40 to about 20 mesh), or 0.3 mm to 0.600 mm (i.e., about 50 mesh to about 30 mesh). The particles may be spherical or non-spherical (e.g., having a prismatic, cylindrical, lobed, polygonal, or a rectangular cross-section). The particles may be hollow or not hollow. Differences in cross-sectional shape allow for control of active surface area, mechanical properties, and interaction with fluid or other components. In some embodiments, the particles useful for practicing the present disclosure have a circular cross-section or a rectangular cross-section.

Typically, the dimensions of the particles in the plurality of solid particles are generally about the same, although use of particles with even significant differences dimensions may also be useful. In some applications, it may be desirable to use multiple different types of particles (e.g., having at least one different polymer or resin, one or more additional polymers, different average sizes, or otherwise distinguishable constructions), where one type offers a certain advantage(s) in one aspect, and other type a certain advantage(s) in another aspect.

Typically, the plurality of solid particles described herein exhibit at least one of (in some embodiments both) hydrocarbon or hydrolytic resistance. In some embodiments, when a 5 percent by weight mixture of the plurality of particles in deionized water is heated at 145° C. for four hours in an autoclave, less than 50% by volume of the plurality of solid particles at least one of dissolves or disintegrates, and less than 50% by volume of the thermoplastic composition and the curable resin at least one of dissolves or disintegrates. Specifically, hydrolytic resistance is determined using the following procedure. One-half gram of particles is placed into a 12 mL vial containing 10 grams of deionized water. The vial is nitrogen sparged, sealed with a rubber septum and placed in an autoclave at 145° C. for 4 hours. The particles are then subjected to optical microscopic examination at 100× magnification. They are deemed to have failed the test if either at least 50 percent by volume of the particles or at least 50 percent by volume of the thermoplastic composition and the curable resin dissolved and/or disintegrated.

In some embodiments, when a 2 percent weight to volume mixture of the plurality of solid particles in kerosene is heated at 145° C. for 24 hours under nitrogen, less than 50% by volume of the plurality of solid particles at least one of dissolves or disintegrates, and less than 50% by volume of the thermoplastic composition and the curable resin at least one of dissolves or disintegrates. Specifically, hydrocarbon resistance is determined using the following procedure. One-half gram of particles is placed into 25 mL of kerosene (reagent grade, boiling point 175-320° C., obtained from Sigma-Aldrich, Milwaukee, Wis.), and heated to 145° C. for 24 hours under nitrogen. After 24 hours, the kerosene is cooled, and the particles are examined using optical microscopy at 100× magnification. They are deemed to have failed the test if either at least 50 percent by volume of the particles or at least 50 percent by volume of the thermoplastic composition and the curable resin dissolved and/or disintegrated.

The plurality of solid particles according to the present disclosure comprises a thermoplastic composition having a softening temperature in a range from 50° C. to 180° C. (in some embodiments, in a range from 60° C. to 180° C., 70° C. to 180° C., 80° C. to 180° C., 80° C. to 170° C., 80° C. to 160° C., 80° C. to 150° C., or 80° C. to 140° C., 90° C. to 180° C.,

90° C. to 160° C., 100° C. to 180° C., 100° C. to 160° C., or 100° C. to 150° C.). For any of the embodiments of the plurality of solid particles disclosed herein, the thermoplastic composition may be a single thermoplastic polymer, a blend of thermoplastic polymers, or a blend of at least one thermoplastic polymer and at least one other (i.e., non-thermoplastic) material. The desired softening temperature can be achieved by selecting an appropriate single thermoplastic polymer or combining two or more thermoplastic polymers. For example, if a thermoplastic polymer softens at too high of a temperature for a particular application it can be decreased by adding a second thermoplastic polymer with a lower softening temperature. Also, a thermoplastic polymer may be combined with, for example, a plasticizer to achieve the desired softening temperature. In some embodiments, the curable resin may be admixed with a thermoplastic, and the resulting admixture has a softening temperature in a range from 50° C. to 180° C. (in some embodiments, in a range from 60° C. to 180° C., 70° C. to 180° C., 80° C. to 180° C., 80° C. to 170° C., 80° C. to 160° C., 80° C. to 150° C., or 80° C. to 140° C., 90° C. to 180° C., 90° C. to 160° C., 100° C. to 180° C., 100° C. to 160° C., or 100° C. to 150° C.).

Exemplary thermoplastics that have or may be modified to have a softening temperature in a range from 50° C. to 180° C. (in some embodiments, in a range from 60° C. to 180° C., 70° C. to 180° C., 80° C. to 180° C., 80° C. to 170° C., 80° C. to 160° C., 80° C. to 150° C., or 80° C. to 140° C., 90° C. to 180° C., 90° C. to 160° C., 100° C. to 180° C., 100° C. to 160° C., or 100° C. to 150° C.) include at least one of ethylene-vinyl alcohol copolymer (e.g., with softening temperature of 156 to 191° C., available from EVAL America, Houston, Tex., under the trade designation "EVAL G176B"), thermoplastic polyurethane (e.g., available from Huntsman, Houston, Tex., under the trade designation "IROGRAN", e.g., "IROGRAN A80 P4699"), polyoxymethylene (e.g., available from Ticona, Florence, Ky., under the trade designation "CELCON", e.g., "CELCON FG40U01"), polypropylene (e.g., available from Total, Paris, France, e.g., under the trade designation "5571"), polyolefins (e.g., available from ExxonMobil, Houston, Tex., under the trade designation "EXACT 8230"), ethylene-vinyl acetate copolymer (e.g., available from AT Plastics, Edmonton, Alberta, Canada), polyester (e.g., available from Evonik, Parsippany, N.J., under the trade designation "DYNAPOL" or from EMS-Chemie AG, Reichenauerstrasse, Switzerland, under the trade designation "GRILTEX"), polyamides (e.g., available from Arizona Chemical, Jacksonville, Fla., under the trade designation "UNIREZ 2662" or from E. I. du Pont de Nemours, Wilmington, Del., under the trade designation "ELVAMIDE", e.g. "ELVAMIDE 8660", or from BASF North America, Florham Park, N.J., under the trade designation "ULTRAMID"), phenoxy (e.g., from Inchem, Rock Hill S.C.), vinyls (e.g., polyvinyl chloride form Omnia Plastica, Arsizio, Italy), acrylics (e.g., from Arkema, Paris, France, under the trade designation "LOTADER AX 8900"), polysulfone, polyimide, polyetheretherketone, or polycarbonate. In some embodiments, the thermoplastic composition comprises a partially neutralized ethylene-methacrylic acid copolymer commercially available, for example, from E. I. duPont de Nemours & Company, under the trade designations "SURLYN 8660," "SURLYN 1702," "SURLYN 1857," and "SURLYN 9520") or an ethylene-acrylic acid ionomer available, for example, from Dow Chemical Company, Midland, Mich., under the trade designations "AMPLIFY 3791" and "AMPLIFY 3702" or from "A. Schulman, Akron, Ohio, under the trade designation "CLARIX 111310" or "CLARIX 211310". In some embodiments, the thermoplastic composition comprises at least one of a polyurethane, a polyamide, a polyester, a polycarbonate, a polylactic acid, an acrylic, a polyimide, or an ionomer. In some embodiments, the thermoplastic composition comprises a mixture of a thermoplastic polyurethane obtained from Huntsman under the trade designation "IROGRAN A80 P4699", a hot melt adhesive obtained from 3M Company, St. Paul, Minn. under the trade designation "SCOTCH-WELD HOT MELT ADHESIVE 3789", and a polyoxymethylene obtained from Ticona under the trade designation "CELCON FG40U01". In some embodiments, the plurality of solid particles further comprises a polyolefin (e.g., obtained from ExxonMobil Chemical under the trade designation "EXACT 8230" or from Dow Chemical under the trade designation "AFFINITY EG 8185".

In some embodiments, including any of the embodiments of a plurality of solid particles disclosed herein, the thermoplastic composition has a modulus of less than $3 \times 10^6$ dynes/cm$^2$ ($3 \times 10^5$ N/m$^2$) at a frequency of about 1 Hz at a temperature greater than −60° C. In these embodiments, typically the first thermoplastic composition is tacky at the temperature greater than −60° C.

The plurality of solid particles disclosed herein comprises a blocked isocyanate resin. Isocyanate blocking agents are compounds that upon reaction with an isocyanate yield a group that is unreactive at room temperature with compounds that are typically isocyanate-reactive at room temperature. Isocyanate groups can be blocked by, for example, alcohols (e.g., aryl alcohols such as phenol and nonylphenol and aliphatic alcohols such as t-butanol, propylene glycol, isopropanol, methanol, n-butanol, n-hexanol, and n-pentanol), oximes (e.g., formaldoxime, acetaldoxime, cyclohexanone oxime, acetophenone oxime, benzophenone oxime, 2-butanone oxime, and diethyl glyoxime), or lactams (e.g., ε-caprolactam, δ-valerolactam, and γ-butyrolactam).

The compound resulting from the blocking agent and the isocyanate is a blocked isocyanate. The blocked isocyanate typically comprises units represented by formula wherein R is alkylene, arylene, or arylalkylene, each of which is optionally interrupted by at least one biruet, allophanate, uretdione, or isocyanurate linkage, c is a value from 2 to 5 (e.g., 2 or 3), and A is, for example, represented by formula wherein each R' is independently hydrogen, alkyl (e.g., having up to 4 carbon atoms), or aryl (e.g., phenyl); represented by formula or represented by formula R'O—, wherein R' is as defined above. In some embodiments, the blocked isocyanate comprises the reaction product of a polyfunctional isocyanate compound and at least one of 3,5-dimethylpyrazole, 2,6-dimethyl-4-heptanone oxime, methyl ethyl ketoxime, 2-heptanone oxime, 1,2,4-triazole, e-caprolactam, nonylphenol, t-butanol, propylene glycol, isopropanol, methanol, n-butanol, n-hexanol, and n-pentanol. The blocking agent may be chosen, for example, to meet curing temperature requirements for a specific application. In addition internal blocking can be used which involves forming a uretdione dimer or a cyclic urea structure (i.e., an isocyanurate). Generally, at elevated temperature the blocking group will be released from the blocked (poly)isocyanate compound thereby generating the isocyanate group again, which can then react with an isocyanate-reactive group (e.g., in the thermoplastic composition). Blocking agents and their mechanisms have been described in detail in "Blocked isocyanates III.: Part. A, Mechanisms and chemistry" by Douglas Wicks and Zeno W. Wicks Jr., Progress in Organic Coatings, 36 (1999), pp. 14-172.

Blocked isocyanate resins include low molecular weight materials, prepolymers, oligomers, and polymers, for example, having a molecular weight in a range from 150 to 5000 grams per mole. Useful blocked isocyanates include liquids and solids, for example, having a melting point of at least 50° C. (in some embodiments, at least 60° C., 70° C., or 80° C., in some embodiments, up to 100° C., 110° C., or 120° C.). Liquid resins may be admixed, for example, with thermoplastic materials to provide solid particles. Useful blocked isocyanate resins generally have, on the average, at least two blocked isocyanate groups per molecule. The "average" number of blocked isocyanate groups per molecule is defined as the number of blocked isocyanate groups divided by the total number of blocked isocyanate molecules present.

Some blocked isocyanate compounds are commercially available, for example, from Degussa Corporation, Parsippany, N.J., under the trade designation "VESTAGON"; and from Baxenden Chemicals Limited, Accrington, Lancashire, England, under the trade designation "TRIXENE BI".

Embodiments of the plurality of solid particles described herein include those comprising a curing agent. The term "curing agent" refers to both reactive multifunctional materials that copolymerize with the isocyanate resin (e.g., by addition polymerization) and components that accelerate the polymerization of the isocyanate resin (i.e., a catalyst). Typical catalysts include a tin II or tin IV salt (e.g., dibutyltin dilaurate, stannous octanoate, stannous oleate, tin dibutyldi-(2-ethyl hexanoate), tin (II) 2-ethyl hexanoate, and stannous chloride) or a tertiary amine (e.g., triethylamine, tributylamine, triethylenediamine, tripropylamine, bis(dimethylaminoethyl) ether, ethyl morpholine, 2,2'-dimorpholinodiethyl ether, 1,4-diazabicyclo[2.2.2]octane (DABCO), and 1,8-diazabicyclo[5.4.0.]undec-7-ene (DBU). In some embodiments, a tin salt is used. The amount of curative present will depend on the particular formulation. Generally, however, suitable catalyst concentrations are from about 0.001 percent to about 10 percent (in some embodiments, about 0.1 percent to about 5 percent or about 0.1 to about 1 percent) by weight based on the total weight of the reactants. In some embodiments, the curing agent is present, for example, with the blocked isocyanate resin and/or the thermoplastic composition described herein. In some embodiments, the thermoplastic composition comprises a curing agent. In some of these embodiments, the thermoplastic composition is formulated with, for example, a catalyst that can cure an isocyanate resin. In some embodiments, the thermoplastic composition includes a thermoplastic with a functional group that is reactive with the isocyanate groups. In some embodiments, the functional group is an amine, a carboxylic acid, or a hydroxyl group. In some embodiments, the thermoplastic composition includes a polyamide. In other embodiments, the thermoplastic composition includes an ethylene-methacrylic acid or ethylene-acrylic acid co-polymer.

In some embodiments, the blocked isocyanate, in combination with any curative and/or accelerator, has an cure onset temperature of at least 80° C. (in some embodiments, at least 85° C., 90° C., 95° C., 100° C., 110° C., 120° C., 130° C., 140° C., 150° C., or at least 160° C. or in a range from 80° C. to 180° C.). The cure onset temperature can be adjusted, for example, by selection of the curative and/or accelerator, by selection of the thermoplastic composition, which may include a functional group that is reactive with the free (i.e., deblocked) isocyanate resin, and by selection of the ratio of the thermoplastic composition and the blocked isocyanate in the plurality of solid particles.

The plurality of solid particles described herein may, for example, comprise at least 30, 40, 50, 60, 70, 75, 80, 90, or at least 95 (in some embodiments, in a range from 35 to 80 or 45 to 75) percent by weight thermoplastic (e.g., including the thermoplastic composition and any other thermoplastics), based on the total weight of the plurality of solid particles. In some embodiments, the plurality of solid particles described herein may, for example, comprise in a range from 5 to 85 (in some embodiments, 5 to 40, 35 to 80, or 45 to 75) percent by weight of the first thermoplastic composition having a softening temperature in a range from 50° C. to 180° C. (in some embodiments, in a range from 60° C. to 180° C., 70° C. to 180° C., 80° C. to 180° C., 80° C. to 170° C., 80° C. to 160° C., 80° C. to 150° C., or 80° C. to 140° C., 90° C. to 180° C., 90° C. to 160° C., 100° C. to 180° C., 100° C. to 160° C., or 100° C. to 150° C.), based on the total weight of the plurality of solid particles.

In some embodiments, the plurality of solid particles disclosed herein has the blocked isocyanate resin present in a range from 5 to 65 (in some embodiments, 10 to 60, or 15 to 55) percent by weight, based on the total weight of the plurality of solid particles.

Particles disclosed herein may be prepared, for example, using standard extrusion, pelletizing, milling, and grinding equipment.

Compositions according to the present disclosure that contain a fluid and a plurality of solid particles dispersed therein may be aqueous, non-aqueous (e.g., comprising hydrocarbon or alcohol), or a combination thereof (e.g., an emulsion), and may optionally comprise one or more surfactants, viscosity modifiers (e.g., gelling agents and breakers), gases (e.g., nitrogen, carbon dioxide, air, and natural gas), buffers, or salts. The pH of the composition may be adjusted to be compatibility with the plurality of particles disclosed herein.

In some embodiments of fluid compositions according to the present disclosure, the fluid is aqueous. In some embodiments of fluid compositions according to the present disclosure, the fluid is a drilling fluid comprising hydrocarbons, which may include water-in-oil emulsions and oil-in-water emulsions. Exemplary hydrocarbons include crude oil; refined hydrocarbons (e.g., gasoline, kerosene, and diesel); paraffinic and isoparaffinic hydrocarbons (e.g., pentanes, hexanes, heptanes, higher alkanes, and isoparaffinic solvents obtained from Total Fina, Paris, France, under trade designations "ISANE IP 130" and "ISANE IP 175" and from Exxon Mobil Chemicals, Houston, Tex., under the trade designation "ISOPAR"); mineral oil; ligroin; naphthenes; aromatics (e.g., xylenes and toluene); natural gas condensates; and combinations (either miscible or immiscible) thereof. Typically drilling fluids that comprise hydrocarbons (i.e., oil-based drilling fluids) comprise mineral oil or diesel. Some drilling fluids comprising hydrocarbons are commercially available, for example, from SynOil under the trade designation "SYN-DRIL" and from Baker Hughes, Houston, Tex., under the trade designations "CARBO-DRIL" and "CARBO-CORE".

In some embodiments, the fluid composition disclosed herein is a drilling fluid comprising a water-in-oil emulsion. A water-in-oil emulsion contains droplets of water or brine dispersed in hydrocarbons. Typically, water-in-oil emulsions contain at least one oil-mud emulsifier, which lowers the interfacial tension between oil and water and allows stable emulsions with small drops to be formed. Oil-mud emulsifiers can be calcium fatty-acid soaps made from various fatty acids and lime, or derivatives such as amides, amines, amidoamines and imidazolines made by reactions of fatty acids and various ethanolamine compounds.

Optionally, the plurality of solid particles described herein may further comprise other components (e.g., additives and/or coatings) to impart desirable properties such as handling, processability, stability, and dispersability and to improve performance when dispersed in a fluid. Exemplary additives and coating materials include antioxidants, colorants (e.g., dyes and pigments), fillers (e.g., carbon black, clays, and silica), and surface applied materials (e.g., waxes, surfactants, polymeric dispersing agents, talcs, erucamide, gums, and flow control agents) to improve handling.

Surfactants can be used to improve the dispersibility of particles described herein, for example, in compositions (e.g., comprising a fluid) according to the present disclosure. Useful surfactants (also known as emulsifiers) include anionic, cationic, amphoteric, and nonionic surfactants. Useful anionic surfactants include alkylarylether sulfates and sulfonates, alkylarylpolyether sulfates and sulfonates (e.g., alkylarylpoly(ethylene oxide) sulfates and sulfonates, preferably those having up to about 4 ethyleneoxy repeat units, including sodium alkylaryl polyether sulfonates such as those known under the trade designation "TRITON X200", available from Rohm and Haas, Philadelphia, Pa.), alkyl sulfates and sulfonates (e.g., sodium lauryl sulfate, ammonium lauryl sulfate, triethanolamine lauryl sulfate, and sodium hexadecyl sulfate), alkylaryl sulfates and sulfonates (e.g., sodium dodecylbenzene sulfate and sodium dodecylbenzene sulfonate), alkyl ether sulfates and sulfonates (e.g., ammonium lauryl ether sulfate), and alkylpolyether sulfate and sulfonates (e.g., alkyl poly(ethylene oxide) sulfates and sulfonates, preferably those having up to about 4 ethyleneoxy units). Useful nonionic surfactants include ethoxylated oleoyl alcohol and polyoxyethylene octylphenyl ether. Useful cationic surfactants include mixtures of alkyl dimethylbenzyl ammonium chlorides, wherein the alkyl chain has from 10 to 18 carbon atoms. Amphoteric surfactants are also useful and include sulfobetaines, N-alkylaminopropionic acids, and N-alkylbetaines. Surfactants may be added to the particles disclosed herein, for example, in an amount sufficient on average to make a monolayer coating over the surfaces of the particles to induce spontaneous wetting. Useful amounts of surfactants may be in a range, for example, from 0.05 to 3 percent by weight, based on the total weight of the plurality of particles.

Polymeric dispersing agents may also be used, for example, to promote the dispersion of particles described herein in the chosen medium, and at the desired application conditions (e.g., pH and temperature). Exemplary polymeric dispersing agents include salts (e.g., ammonium, sodium, lithium, and potassium) of polyacrylic acids of greater than 5000 average molecular weight, carboxy modified polyacrylamides (available, for example, under the trade designation "CYANAMER A-370" from Cytec Industries, West Paterson, N.J.), copolymers of acrylic acid and dimethylaminoethylmethacrylate, polymeric quaternary amines (e.g., a quaternized polyvinyl-pyrollidone copolymer (available, for example, under the trade designation "GAFQUAT 755" from ISP Corp., Wayne, N.J.) and a quaternized amine substituted cellulosic (available, for example, under the trade designation "JR-400" from Dow Chemical Company, Midland, Mich.), cellulosics, carboxy-modified cellulosics (e.g., sodium carboxy methycellulose (available, for example, under the trade designation ""NATROSOL CMC Type 7L" from Hercules, Wilmington, Del.), and polyvinyl alcohols. Polymeric dispersing agents may be added to the particles disclosed herein, for example, in an amount sufficient on average to make a monolayer coating over the surfaces of the particles to induce spontaneous wetting. Useful amounts of polymeric dispersing agents may be in a range, for example, from 0.05 to 5 percent by weight, based on the total weight of the plurality of particles.

Examples of antioxidants which may be useful in the plurality of solid particles disclosed herein include hindered phenols (available, for example, under the trade designation "IRGANOX" from Ciba Specialty Chemical, Basel, Switzerland). Typically, antioxidants are used in a range from 0.1 to 1.5 percent by weight, based on the total weight of the plurality of particles, to retain useful properties during extrusion and through the life of, for example, the plurality of particles or the plurality of particles dispersed in a fluid composition.

Fluid compositions according to the present disclosure may further comprise a gelling agent (e.g., a phosphoric acid ester when the fluid composition is a drilling fluid comprising hydrocarbons). In some of these embodiments, the fluid composition further comprises an activator (e.g., a source of polyvalent metal ions) for the gelling agent. Gelling agents and activators useful in practicing the present disclosure are described, for example, in U.S. Pat. No. 4,622,155 (Harris et al.) and U.S. Pat. No. 5,846,915 (Smith et al.), the disclosures of which are incorporated herein by reference. In some embodiments wherein gelling agents are used, a suitable breaker may be included in or added to the fluid composition so that the viscosity of the fluid composition may eventually be reduced, for example, to recover it from the subterranean formation at a desired time. Suitable breakers include, for example, those described in U.S. Pat. No. 7,066,262 (Funkhouser), the disclosure of which is incorporated herein by reference.

In some embodiments, fluid compositions according to the present disclosure comprise bridging particles (e.g., dispersed in the fluid). In some embodiments, the plurality of solid particles disclosed herein includes bridging particles. Bridging particles are sometimes used with drilling fluids in an effort to use fractures to cause stress changes in the rock. The fractures are held open with the bridging particles, and the bridging particles may be held together by, for example, the plug formed after the thermoplastic reaches its softening temperature and the isocyanate resin is cured. Exemplary bridging particles known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand particles are available, for example, from Badger Mining Corp., Berlin, Wis.; Borden Chemical, Columbus, Ohio;

and Fairmont Minerals, Chardon, Ohio. Thermoplastic particles are available, for example, from the Dow Chemical Company, Midland, Mich.; and BJ Services, Houston, Tex. Clay-based particles are available, for example, from CarboCeramics, Irving, Tex.; and Saint-Gobain, Courbevoie, France. Sintered bauxite ceramic particles are available, for example, from Borovichi Refractories, Borovichi, Russia; 3M Company, St. Paul, Minn.; CarboCeramics; and Saint Gobain. Glass bubble and bead particles are available, for example, from Diversified Industries, Sidney, British Columbia, Canada; and 3M Company.

Useful bridging particles have sizes, for example, in a range from 0.100 mm to 3 mm (i.e., about 140 mesh to about 5 mesh (ANSI)) (in some embodiments, in a range from 1 mm to 3 mm, 1 mm to 2 mm, 1 mm to 1.7 mm (i.e., about 18 mesh to about 12 mesh), 0.85 mm to 1.7 mm (i.e., about 20 mesh to about 12 mesh), 0.85 mm to 1.2 mm (i.e., about 20 mesh to about 16 mesh), 0.6 mm to 1.2 mm (i.e., about 30 mesh to about 16 mesh), 0.425 mm to 0.85 mm (i.e., about 40 to about 20 mesh), or 0.3 mm to 0.600 mm (i.e., about 50 mesh to about 30 mesh). In some embodiments, the average size of the bridging particles and the average size of the plurality of solid particles disclosed herein is about the same (e.g., within 20, 15, 10, or 5 percent).

The present disclosure provides a method of modifying a wellbore within a geological formation. The method comprises introducing into a wellbore penetrating the geological formation a fluid composition disclosed herein (e.g., in any of the embodiments described above).

The method of modifying a wellbore within a geological formation disclosed herein also comprises subjecting the thermoplastic composition to a temperature above its softening temperature. Above the softening temperature, for example, at the temperature of the subterranean formation, the thermoplastic composition may become tacky (i.e., have a modulus of less than $3\times10^6$ dynes/cm$^2$ ($3\times10^5$ N/m$^2$) at a frequency of about 1 Hz), and the particles in plurality of particles can adhere to each other. The tacky network that may be formed almost instantaneously when the particles reach their desired position in the formation may be useful, for example, to hold bridging particles in place in the formation. In some embodiments, the thermoplastic composition is designed to be tacky at a specific downhole temperature (e.g., the bottomhole static temperature (BHST).

Also, above the softening temperature (e.g., at the melting temperature), the thermoplastic composition may begin to flow. In some embodiments, wherein the thermoplastic composition comprises a thermoplastic with a functional group that is reactive with the isocyanate resin or wherein the thermoplastic composition comprises a curing agent for the isocyanate resin, when the thermoplastic composition is exposed to a temperature above its softening temperature, acceleration of the curing of the isocyanate resin may occur.

The method of modifying a wellbore within a geological formation disclosed herein also comprises subjecting the blocked isocyanate resin to a temperature sufficient to produce a free isocyanate resin. Blocked isocyanates are advantageous, for example, for preventing curing of the isocyanate resin before it is placed in the desired location in the subterranean formation. In some embodiments, the plurality of particles is designed to have a cure onset at a specific downhole temperature. In some embodiments, the temperature sufficient to produce a free isocyanate resin is within about 20 degrees (in some embodiments, within about 15, 10, 8, or 5 degrees) of the melting temperature of the thermoplastic composition.

The method of modifying a wellbore within a geological formation disclosed herein also comprises at least partially curing the free (i.e., deblocked) isocyanate resin to form a plug in the wellbore. The term "plug" refers to a covalently cross-linked network that is formed in the wellbore, for example, filling the wellbore, filling any fractures that are formed in the formation during the drilling of the wellbore, and consolidating weak formations around the wellbore. The plug that is formed from the plurality of particles after curing the isocyanate resin, which may include any bridging particles that were used in the composition, is typically designed to have low permeability, for example, to prevent fluid loss and to prevent drilling fluid from causing any further elongation of the fracture in the formation. In some embodiments, the thermoplastic present with the cured resin in the plug can toughen the consolidated formation or pack present in the fractures.

In the methods of modifying a wellbore described herein, at least partial curing of the free isocyanate resin refers to, for example, when at least 50 (in some embodiments, at least 60, 70, 75, 80, 90, 95, or 97) percent of the isocyanate groups in the isocyanate resin are reacted. In some embodiments, at least partially curing the isocyanate resin means that the gel point of the isocyanate resin, in combination with the thermoplastic composition, has been reached. The gel point refers to the time or temperature at which a cross-linked three-dimensional network begins to form. The gel point can be measured using the rheological evaluations described in the examples below. In some embodiments, the plurality of solid particles gels within a period of 4 to 10 hours after introducing the fluid composition into the wellbore. In some embodiments, the plurality of solid particles gels at least 4, 5, 6, 7, or 8 hours after introducing the fluid composition into the wellbore.

In some embodiments of methods of modifying a wellbore disclosed herein, the method further comprises drilling the wellbore, wherein introducing the fluid composition is carried out during or after drilling the wellbore. Advantageously, the plurality of particles disclosed herein is compatible with a variety of drilling fluid compositions. During the drilling process, if an unconsolidated zone or a fracture in the formation is detected, the rotation of the drill can be stopped, and a fluid composition disclosed herein comprising the plurality of solid particles can be introduced to the wellbore without removing the drill or flushing out the drilling fluid. Once the plurality of particles reaches the target depth, it typically will cure to form the plug. Once the plug is formed, drilling can be resumed through the plug to reach deeper zones of the formation.

Methods according to the present disclosure can be used in vertical wells, deviated wells, inclined wells or horizontal wells and may be useful for oil wells, gas wells, and combinations thereof.

Exemplary geological formations that may be modified according to the present disclosure include siliciclastic (e.g., shale, conglomerate, diatomite, sand, and sandstone) or carbonate (e.g., limestone) formations. Typically, compositions and methods according to the present disclosure can be used to treat siliciclastic formations. In some embodiments, the geological formation is predominantly sandstone (i.e., at least 50 percent by weight sandstone). Thermoplastic compositions and blocked isocyanate resins may be selected, for example, so that the plug that is formed in the wellbore has good adhesion to the formation.

Figure 1:
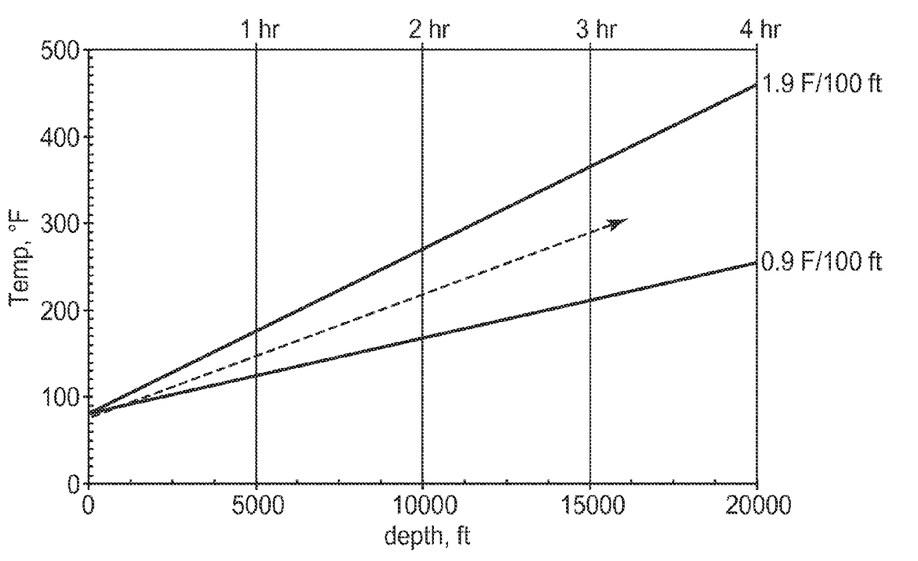
FIG. 1 is a chart of a typical wellbore temperature profile at different depths, pumping times, and drilling rates.

The method of making a plurality of particles according to the present disclosure can be useful, for example, for customizing the plurality of particles or fluid compositions for selected geological zone of a subterranean formation. Data comprising the target depth and temperature of the geological zone can be used to generate a formulation comprising a thermoplastic composition and a curable resin. Some typical data comprising the target depth and temperature of a geological formation is shown in FIG. 1, wherein the discontinuous line represents the typical temperature that may be reached at a certain depth. The thermoplastic composition can be selected based at least partially on its softening temperature being below the temperature in the geological zone based on its suitable viscous flow at the temperature in the geological zone. The blocked isocyanate resin is selected based at least partially on its deblocking temperature being below the temperature in the geological zone. The deblocking temperature should be close to the temperature in the geological zone so that the plurality of particles could be delivered to the geological zone before it cures. The formulation is generated based at least partially on its gelling after the target depth is reached.

Compositions and methods disclosed herein may be useful for geological zones having depths in a range from 3000 feet to 20000 feet. In some embodiments, the geological zone has a depth in a range from 6000, 7000, 8000, 9000, or 10000 feet up to 20000 feet. In some embodiments of the method of modifying a wellbore within a geological formation disclosed herein, the fluid composition disclosed herein is injected to a depth of at least 10,000 (in some embodiments, at least 15000 or 17500) feet. In some of these embodiments, the plurality of solid particles has a gel point above the softening temperature of the thermoplastic composition, and wherein the gel point is achieved after the depth is reached.

The drilling rate and pumping time that can be achieved in the field also provides useful guidance for customizing the plurality of particles and fluid compositions disclosed herein and may influence how a method of modifying a wellbore disclosed herein is carried out. For example, the drilling rate and pumping time can be used to determine when a fluid composition disclosed herein should be introduced into the wellbore, so that it can reach the desired depth before the gel point of the plurality of solid particles.

SELECTED EMBODIMENTS OF THE DISCLOSURE

In a first embodiment, the present disclosure provides a plurality of solid particles comprising:
a thermoplastic composition having a softening temperature in a range from 50° C. to 180° C.; and
a blocked isocyanate resin,
wherein optionally at least some of the particles in the plurality of solid particles comprise both the thermoplastic composition and the blocked isocyanate resin.

In a second embodiment, the present disclosure provides the plurality of solid particles according to the first embodiment, wherein the thermoplastic composition comprises a thermoplastic polymer with at least one functional group that is reactive with an isocyanate group.

In a third embodiment, the present disclosure provides the plurality of solid particles according to the second embodiment, wherein the thermoplastic polymer comprises at least one of an amine, a carboxylic acid, or a hydroxyl group.

In a fourth embodiment, the present disclosure provides the plurality of solid particles according to any preceding embodiment, wherein the blocked isocyanate resin comprises the reaction product of an isocyanate and at least one of an alcohol, an oxime, or a lactam.

In a fifth embodiment, the present disclosure provides the plurality of solid particles according to any one of the first to third embodiments, wherein the blocked isocyanate resin comprises at least one of an uretdione dimer or an isocyanurate.

In a sixth embodiment, the present disclosure provides the plurality of solid particles according to any preceding embodiment, wherein the thermoplastic composition comprises at least one of a polyurethane, a polyamide, a polyester, a polycarbonate, a polylactic acid, an acrylic, a polyimide, or an ionomer.

In a seventh embodiment, the present disclosure provides the plurality of solid particles according to any preceding embodiment, wherein at least some of the particles in the plurality of solid particles comprise both the thermoplastic composition and the blocked isocyanate resin.

In an eighth embodiment, the present disclosure provides the plurality of solid particles according to any one of the first to seventh embodiments, wherein the thermoplastic composition and the blocked isocyanate resin are in separate particles of the plurality of solid particles.

In a ninth embodiment, the present disclosure provides the plurality of solid particles according to any preceding embodiment, wherein at least some of the particles in the plurality of solid particles have at least one of an aspect ratio of less than 2:1 or an average particle size of up to 2 millimeters.

In a tenth embodiment, the present disclosure provides the plurality of solid particles according to any preceding embodiment, wherein the blocked isocyanate resin has a deblocking temperature in a range from 80° C. to 180° C.

In an eleventh embodiment, the present disclosure provides a composition comprising a fluid and the plurality of solid particles of any preceding embodiment dispersed in the fluid.

In a twelfth embodiment, the present disclosure provides the composition according to the eleventh embodiment, wherein the fluid is a drilling fluid comprising hydrocarbons.

In a thirteenth embodiment, the present disclosure provides the composition according to the twelfth embodiment, wherein the fluid is a drilling fluid comprising a water-in-oil emulsion.

In a fourteenth embodiment, the present disclosure provides a method of modifying a wellbore within a geological formation, the method comprising:
introducing the composition according to any one of embodiments 11 to 13 into the wellbore;
subjecting the thermoplastic composition to a temperature above its softening temperature;
subjecting the blocked isocyanate resin to a temperature sufficient to produce a free isocyanate resin; and
at least partially curing the free isocyanate resin to form a plug in the wellbore.

In a fifteenth embodiment, the present disclosure provides the method according to embodiment 14, wherein the plug comprises an interpenetrating network of the thermoplastic composition and at least partially cured isocyanate resin.

In a sixteenth embodiment, the present disclosure provides the method according to embodiment 14 or 15, wherein introducing the composition comprises introducing the composition to a depth of at least 10,000 feet.

In a seventeenth embodiment, the present disclosure provides the method according to embodiment 16, wherein the plurality of solid particles gels above the softening temperature of the thermoplastic composition, and wherein the plurality of solid particles gels after the depth is reached.

In an eighteenth embodiment, the present disclosure provides the method according to any one of embodiments 14 to 17, further comprising drilling the wellbore, wherein introducing the composition is carried out during or after drilling the wellbore.

In a nineteenth embodiment, the present disclosure provides the method according to embodiment 18, wherein any fractures formed during drilling the wellbore are filled by the plug in the wellbore.

In a twentieth embodiment, the present disclosure provides the method according to any one of embodiments 18 or 19, wherein drilling is carried out at a drilling rate, and wherein the drilling rate is used to determine when to introduce the composition.

In a twenty-first embodiment, the present disclosure provides the method according to any one of embodiments 14 to 20, wherein the geological formation comprises sandstone.

In a twenty-second embodiment, the present disclosure provides the method according to embodiment 14, wherein the plurality of solid particles gels within a period of 4 to 10 hours after introducing the composition into the wellbore.

In a twenty-third embodiment, the present disclosure provides a method of making a plurality of particles, the method comprising:

selecting a zone of a geological formation to be drilled, the zone having a target depth and a temperature;

receiving data comprising the target depth and the temperature of the zone of the geological formation;

generating a formulation comprising a thermoplastic composition and a blocked isocyanate resin, wherein the thermoplastic composition is selected based at least partially on its softening temperature being below the temperature in the zone, wherein the blocked isocyanate resin is selected based at least partially on its deblocking temperature being below the temperature in the zone, and wherein the formulation is generated based at least partially on its gelling after the target depth is reached; and making the plurality of particles according to the formulation, wherein at least a portion of the plurality of particles comprises the thermoplastic composition, wherein at least a portion of the plurality of particles comprises the blocked isocyanate resin.

Advantages and embodiments of this disclosure are further illustrated by the following examples, but the particular materials and amounts thereof recited in these examples, as well as other conditions and details, should not be construed to unduly limit this invention. All parts and percentages are by weight unless otherwise indicated.

EXAMPLES

Softening Temperature

The softening temperatures of the thermoplastic compositions were determined using a stress-controlled rheometer (Model AR2000 manufactured by TA Instruments, New Castle, Del.) according to the following procedure.

The thermoplastic material was placed between two 20 mm parallel plates of the rheometer and pressed to a gap of 2 mm ensuring complete coverage of the plates. A sinusoidal frequency of 1 Hz at 1% strain was then applied over a temperature range of 60-200° C. The resistance force of the molten resin to the sinusoidal strain was proportional to its modulus which was recorded by a transducer and displayed in graphical format. Using rheometeric software, the modulus is mathematically split into two parts: one part that was in phase with the applied strain (elastic modulus—solid-like behavior), and another part that was out of phase with the applied strain (viscous modulus—liquid-like behavior). The temperature at which the two moduli were identical (cross-over temperature) was defined as a softening temperature, as it represents the temperature above which the resin began to behave predominantly like a liquid.

EXAMPLES

Example 1

The first material was a polyamide resin from E. I. du Pont de Nemours, Wilmington, Del., under the trade designation "ELVAMIDE 8066".

The second material was a blocked isocyanate resin obtained from Degussa Corporation, Parsippany, N.J., under the trade designation "VESTAGON EP BF 9030".

Each of the first and second materials was ground using a cryo-grinder to a particle size in a range from 200 to 3000 microns.

For Example 1, the powders of the first and second materials were combined in a 50/50 weight ratio.

Examples 2-9

Examples 2-9 were prepared according to the method of Example 1 except using the materials indicated in Table 1, below. The grades of polyamide materials obtained from E. I. du Pont de Nemours under the trade designation "ELVAMIDE" and the grades of blocked isocyanate resins obtained from Degussa Corporation under the trade designation "VESTAGON" are shown in Table 1, below. The melting temperature of the thermoplastic resin and the deblocking temperature of the isocyanate resin were obtained from product data sheets for these materials. In Table 1, "--" means "not measured".

TABLE 1

| Ex. | Polyamide, melt temp. (° C.) | Isocyanate, deblock temp. (° C.) | Temp. 1, time | Gel Time (hours) at Temp 1 | Temp. 2, time | Gel Time (hours) at Temp 2 |
|---|---|---|---|---|---|---|
| 1 | "E8066", 115 | "EP-BF 9030", 120 | 120° C., 8 | 4.3 | 140° C., 4 | >4 |
| 2 | "E8023", 150 | "EP-BF 9030", 120 | 150° C., 2 | none | 160° C., 6 | >6 |
| 3 | "E8063", 160 | "EP-BF 9030", 120 | 160° C., 4 | 4 | — | — |
| 4 | "E8066", 115 | "B 1400", 160 | 180° C., 1 | none | — | — |
| 5 | "E8023", 150 | "B 1400", 160 | 160° C., 6 | none | — | — |
| 6 | "E8063", 160 | "B 1400", 160 | 160° C., 6 | none | — | — |
| 7 | "E8066", 115 | "B 1065", 170 | 170° C., 6 | none | — | — |
| 8 | "E8023", 150 | "B 1065", 170 | 170° C., 6 | none | — | — |
| 9 | "E8063", 160 | "B 1065", 170 | 180° C., 1 | 1.5 | — | — |

Dynamic moduli were measured for Examples 1 to 9 as a function of time at a constant temperature of 120° C., 140° C., 150° C., 160° C., 170° C., and 180° C. using a stress-controlled rheometer (Model AR2000 manufactured by TA Instruments) according to the following procedure.

The thermoplastic material was placed between two 20 mm parallel plates of the rheometer and pressed to a gap of 2 mm ensuring complete coverage of the plates. A sinusoidal frequency of 1 Hz at 1% strain was then applied at the temperature shown in Table 1, above. The resistance force of the molten resin mixture to the sinusoidal strain was proportional to its modulus which was recorded by a transducer and displayed in graphical format. Using rheometeric software, the modulus is mathematically split into two parts: one part that was in phase with the applied strain (elastic modulus—solid-like behavior), and another part that was out of phase with the applied strain (viscous modulus—liquid-like behavior). The time at which the two moduli were identical (cross-over point) was defined as a gel time, as it represents the temperature above which the resin began to behave predominantly like a solid because of curing. The evaluations were run for a period of 1 to 8 hours at constant deformation and temperature. The duration of the evaluation is given in Table 1, above, with the temperature of each evaluation.

FIG. 1 is a chart of a typical wellbore temperature profile at different depths, pumping times, and drilling rates. When comparing FIG. 1 to the data in Table 1, it can be seen that blends of Examples 1 to 3 may be useful, for example, when the temperature of the well is 120° C. to 140° C., corresponding to depths of 15,000 to 17,500 feet, and blends of Examples 7 to 9 may be useful, for example, when the temperature of the well is 160° C. to 180° C., corresponding to depths of 17,500 to 20,000 feet.

Adhesion Evaluation of Example 1

Two different specimens were prepared as follows. Enough powder was used to fill a 3 mm, circular gap between two sections, a core and an outer portion, of a tan sandstone cube obtained from The Briar Hill Stone Co., Glenmont, Ohio. This gap was achieved by drilling a 1-inch (2.5 cm) diameter hole through a 2×2×2 inches (5×5×5 centimeters) sandstone and replacing the 18 mm diameter core into the hole. The powder was pressed down into the gap to mitigate the fluffiness of the powder. The resulting specimen was heated in an oven at 120° C. for 6 hours and then transferred to a hydraulic press obtained from Chandler Engineering, Tulsa, Okla., under the trade designation "DCST", model 4207D. The specimen was sandwiched between a Teflon piston (1 inch (2.5 cm) diameter, 1 inch (2.5 cm) long), and a 1 inch (2.5 cm) in height square tube section, before receiving a compressive load that was systematically increased until failure by shear was observed. At failure part of the piston was inside the specimen and part of the specimen's core was inside the square tube. The ultimate shear stress was calculated from the maximum load. One specimen exhibited shear failure of 25 psi ($1.7 \times 10^5$ Pa) at the inner surface. It was observed that the adhesive separated from the inner most surface during curing, which was thought to result from thermal expansion during curing.

The procedure was repeated, and the second specimen exhibited shear failure of 75 psi ($5.2 \times 10^5$ Pa) on the outer surface. In this second specimen failure of the sandstone substrate was observed.

Foreseeable modifications and alterations of this disclosure will be apparent to those skilled in the art without departing from the scope and spirit of this disclosure. This invention should not be restricted to the embodiments that are set forth in this application for illustrative purposes.

What is claimed is:

1. A composition comprising a fluid comprising hydrocarbon or alcohol and a plurality of solid particles dispersed in the fluid, the plurality of solid particles comprising:
a thermoplastic composition having a softening temperature in a range from 50° C. to 180° C.; and
a blocked isocyanate resin, wherein the thermoplastic composition and the blocked isocyanate resin are in separate solid particles of the plurality of solid particles, or wherein at least some of the particles in the plurality of solid particles comprise both the thermoplastic composition and the blocked isocyanate resin.

2. The composition according to claim 1, wherein the thermoplastic composition comprises a thermoplastic polymer with at least one functional group that is reactive with an isocyanate group.

3. The composition according to claim 1, wherein the blocked isocyanate resin comprises the reaction product of an isocyanate and at least one of an alcohol, an oxime, or a lactam, or wherein the blocked isocyanate resin comprises at least one of an uretdione dimer or an isocyanurate, and wherein the thermoplastic composition comprises at least one of a polyurethane, a polyamide, a polyester, a polycarbonate, a polylactic acid, an acrylic, a polyimide, or an ionomer.

4. The composition according to claim 1, wherein at least some of the particles in the plurality of solid particles comprise both the thermoplastic composition and the blocked isocyanate resin.

5. The composition according to claim 1, wherein the thermoplastic composition and the blocked isocyanate resin are in separate particles of the plurality of solid particles.

6. The composition according to claim 1, wherein the blocked isocyanate resin has a deblocking temperature in a range from 80° C. to 180° C.

7. The composition according to claim 1, wherein the fluid is a drilling fluid comprising hydrocarbons.

8. The composition according to claim 1, wherein the fluid is a drilling fluid comprising a water-in-oil emulsion.

9. The composition according to claim 1, wherein the solid particles in the plurality of solid particles have an average particle size of at least 0.425 millimeters.

10. The composition according to any claim 1, wherein the solid particles in the plurality of solid particles have an average aspect ratio in a range from 2:1 to 1000:1.

11. A method of modifying a wellbore within a geological formation, the method comprising:
introducing a composition into the wellbore, wherein the composition comprises a fluid and a plurality of solid particles dispersed in the fluid, wherein the plurality of solid particles comprises a blocked isocyanate resin and a thermoplastic composition with a softening temperature in a range from 50° C. to 180° C., wherein the thermoplastic composition and the blocked isocyanate resin are in separate solid particles of the plurality of solid particles, or wherein at least some of the particles in the plurality of solid particles comprise both the thermoplastic composition and the blocked isocyanate resin;
subjecting the thermoplastic composition to a temperature above its softening temperature;
subjecting the blocked isocyanate resin to a temperature sufficient to produce a free isocyanate resin; and
at least partially curing the free isocyanate resin to form a plug in the wellbore.

12. The method according to claim 11, wherein the plug comprises an interpenetrating network of the thermoplastic composition and at least partially cured isocyanate resin.

13. The method according to claim 11, wherein introducing the composition comprises introducing the composition to a depth of at least 10,000 feet, wherein the plurality of solid particles gels above the softening temperature of the thermoplastic composition, and wherein the plurality of solid particles gels after the depth is reached.

14. The method according to claim 11, further comprising drilling the wellbore, wherein introducing the composition is carried out during or after drilling the wellbore, and wherein any fractures formed during drilling the wellbore are filled by the plug in the wellbore.

15. The method according to claim 14, wherein drilling is carried out at a drilling rate, and wherein the drilling rate is used to determine when to introduce the composition.

16. The method according to claim 11, wherein the geological formation comprises sandstone.

17. The method according to claim 11, wherein the plurality of solid particles gels within a period of 4 to 10 hours after introducing the composition into the wellbore.

18. A method of making a plurality of particles for a composition according to claim 1, the method comprising:
selecting a zone of a geological formation to be drilled, the zone having a target depth and a temperature;
receiving data comprising the target depth and the temperature of the zone of the geological formation;
generating a formulation comprising a thermoplastic composition and a blocked isocyanate resin, wherein the thermoplastic composition is selected based at least partially on its softening temperature being below the temperature in the zone, wherein the blocked isocyanate resin is selected based at least partially on its deblocking temperature being below the temperature in the zone, and wherein the formulation is generated based at least partially on its gelling after the target depth is reached; and
making the plurality of particles according to the formulation, wherein at least a portion of the plurality of particles comprises the thermoplastic composition, wherein at least a portion of the plurality of particles comprises the blocked isocyanate resin.

19. A plurality of solid particles comprising:
a thermoplastic composition having a softening temperature in a range from 50° C. to 160° C.; and
a blocked isocyanate resin,
wherein the thermoplastic composition and the blocked isocyanate resin are in separate solid particles of the plurality of solid particles, or wherein at least some of the particles in the plurality of solid particles comprise both the thermoplastic composition and the blocked isocyanate resin, and wherein the thermoplastic composition comprises at least one of a polyamide, a polycarbonate, a polylactic acid, an acrylic, a polyimide, or an ionomer.

20. The plurality of solid particles according to claim 19, wherein the thermoplastic composition comprises an ethylene-methacrylic acid or ethylene-acrylic acid co-polymer.

* * * * *